Jan. 11, 1966   J. A. SAFFIR   3,228,657

DENTAL ENGINES

Filed Aug. 8, 1963

INVENTOR
JACOB A. SAFFIR
BY Frederick W. Turnbull
ATTORNEY

United States Patent Office 3,228,657
Patented Jan. 11, 1966

3,228,657
DENTAL ENGINES
Jacob A. Saffir, Los Angeles, Calif., assignor to The Dentists' Supply Company of New York, York, Pa., a corporation of New York
Filed Aug. 8, 1963, Ser. No. 306,649
5 Claims. (Cl. 253—86)

This application is a continuation-in-part of the application Serial No. 105,065 filed April 24, 1961, now U.S. Patent No. 3,108,781.

This invention relates to dental engines and more particularly to means to rotate cutting and grinding tools used by dentists and dental technicians.

It has been found to be desirable to rotate tools at a very high speed and, for this purpose, there have recently been developed both hydraulic and pneumatic turbines. As an example of the present invention, a dentist's hand piece is used, and it is described as being a pneumatic device. It is to be understood, however, that the device may be made for uses other than in a hand piece. The problems that arise in hydraulic turbines are not as critical as in pneumatic turbines because of the incompressibility of the hydraulic materials. The use of air as the power source gives certain advantages over the use of water among which advantages are the higher speeds, and the fact that if too much force is exerted by the dentist, the device will be more easily stopped, which is a desirable safety feature.

Turbines for these services have been made that use minute ball bearings to support both the radial and the axial thrusts developed in using the machine. Such machines are plagued with frequent bearing failures making it necessary for the dentist or technician to have duplicate equipment on hand at all times.

In turbine design for conventional uses it has been found that in turbines where the steam, for instance, impinges on the end surfaces of the rotor for developing power while flowing radially, it is difficult to avoid axial movement of the rotor since the necessary expansion from centrally located nozzles to the periphery of the turbine rotor must be $\pi$ times the radial distance, or in a turbine such as disclosed in the Docke et al. Patent 784,989 where the expansion is from nozzles located near the periphery of the rotor and the radial flow is toward the center, the expansion must be done in a path varying inversely with $\pi$ times the radial distance.

The known dental engines of the turbine type are of the peripheral bucket type and due to the excessively high rotational speeds and due to the end thrust on the turbine rotor in use, the bearings, whether ball bearings or jeweled bearings, are subject to excessive wear.

It is an object of the present invention to provide a dental machine in which the load on the bearings is minimized so that the causes of bearing failure will be substantially eliminated.

It is a further object of the present invention to provide a dental turbine in which axial movement of the rotor in use is resisted by fluid pressure of the fluid used to rotate the turbine against the ends of the turbine rotor.

It is a still further object of the invention to provide a turbine of the type described having its nozzles and buckets at the ends of the rotor and so constructed and arranged that the flow of fluid against the ends of the rotor does not tend to draw the rotor toward that end of the turbine housing.

Other and further objects and advantages will appear from the attached specification taken with the accompanying drawings in which like characters of reference refer to similar parts in the several views and in which.

Figure 1:
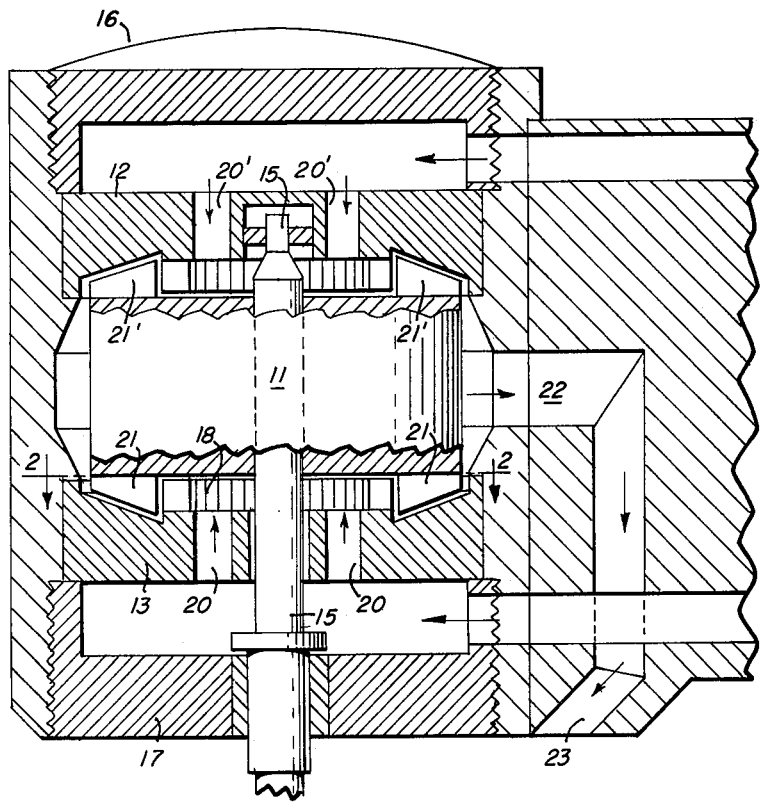
FIGURE 1 is a sectional view of a dental hand piece incorporating an exemplification of the invention.

In FIGURE 1 there is a turbine casing 10. A turbine rotor 11 is mounted centrally in casing 10 between end plates 12 and 13 that constitute stators. These end plates or stators may both be similar to 13, that is, mirror images of each other, or, as shown, plate 12 may carry a bearing 14 of any suitable kind but shown here as a jewel bearing. If end plate 12 were a mirror image of plate 13, then shaft 15 of the rotor 11 will pass through plate 12 to a bearing mounted in end closure 16 similar to the bearing seen in end closure 17, or any other suitable bearing.

Figure 2:
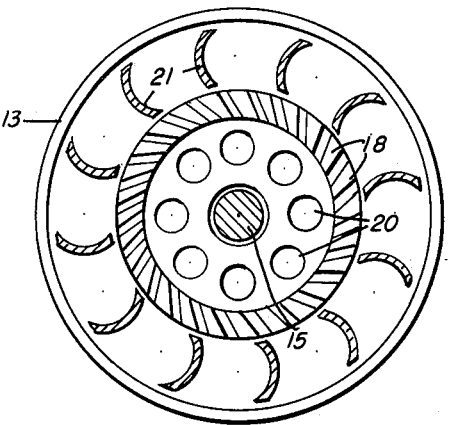
FIGURE 2 is an axial view looking downwardly of the lower stator.
Figure 3:
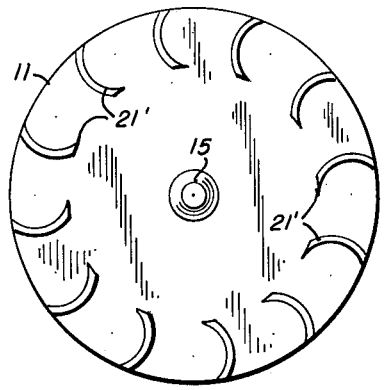
FIGURE 3 is an axial view looking downwardly of the rotor.

The stator 13 is seen in FIGURE 2 looking down and is seen edgewise in FIGURE 1. Looking down in FIGURE 3 it is seen that there is a ring of projections 18 with passages 19 between them forming, in effect, nozzles that extend tangentially to give a rotation to air passing radially outwardly from apertures 20 that are located within ring 18, 19. Buckets 21, two of which are seen in dotted lines in FIGURE 2, extend downwardly from the turbine rotor 11 as seen in FIGURE 1. Blades 21' extend upwardly from the top of rotor 11 outwardly of a circle of projection 18' and passages 19' similar to 18, 19, respectively.

It will be noted that the axial height of the buckets 21, or 21', is greater near the passages 19 than they are at the periphery of the rotor giving the buckets an outward taper. This charge of height of the buckets is such that there will be no venturi action tending to pull the rotor toward the stator as there would be if the blades did not have the tapered form. The buckets 21 or 21' may be of impulse or reaction type.

Since by the tapered blade and tapered wall on the stator a considerable pressure is maintained against the end of rotor 11, the rotor will be biased axially. The corresponding structure being provided at the other end of the rotor, the two biasing forces will normally be balanced. Any axial movement of the rotor will increase the pressure on the end of the rotor toward which the rotor moves because the passage between the rotor and stator will be constricted and such movement will reduce the pressure on the end from which the rotor moves because the passage will be enlarged.

The air escaping at the periphery of the rotor 11 will pass into an exhaust passage 22 to be led to any appropriate discharge point which may be a passage 23 extending toward a tool operated by the turbine.

Figure 4:
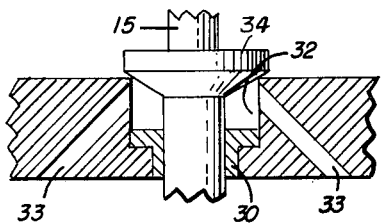
FIGURE 4 is a fragmentary section of a modification that may be incorporated in the device to augment the self-centering ability of the rotor.

Some form of bearings that limit axial movement of the shaft should be provided to prevent excessive axial movement of the rotor, as it would clearly not be desirable for the rotor to contact the end plates. The present application, however, is not concerned with the specific bearings selected. It will be understood that valve means similar to that shown in copending application Serial No. 105,065 may be used at the end of the housing adjacent the burr, so that upon slight movement of the burr the pressure between plates 13 and 17 will vent to atmosphere. Such a valve means is shown in FIGURE 4 where the valve means 34 moving away from cavity 32, that is vented to atmosphere by auxiliary exhaust passages 33, will reduce the pressure against the adjacent end of the rotor so the pressure on the remote end of the rotor will be the more effective to re-center the rotor.

It will be seen, therefore, that a turbine has been provided in which end thrusts are carried principally by pressure of the air that provides the motive power.

It will be understood that with the specific structures described above in view, other modifications of the device can be made without departing from the scope of the following claims:

I claim:
1. In an air driven dental turbine having a casing including opposed ends, a stator plate at each end of the casing inwardly of said opposed ends, a shaft rotatably mounted in said casing, and a rotor fixed to said shaft for rotation between said stator plates; the novelty comprising a row of turbine buckets on the axial ends of said rotor adjacent the periphery of said rotor, and a plurality of nozzles in said stator plates positioned radially inwardly of said turbine buckets and arranged to direct air tangentially outwardly so that air passing through said nozzles will impinge on said buckets to rotate said rotor, said buckets extending axially from the ends of said rotor and being curved in the radial direction, the axial length of said buckets being greatest at their radial inward edge and tapering in their axial length toward the periphery of the rotor, the steepness of the taper being such that a circular section through the blades at any radius is of substantially equal area to any other similar section, when said rotor is centered axially between said stator plates.

2. The dental turbine of claim 1 in which said turbine buckets are of the reaction type.

3. The device of claim 1 in which said turbine buckets are impulse buckets.

4. In a dental turbine, a housing, an end plate at each end of said housing, at least one of said end plates being provided with an aperture through which a shaft may extend, two stator plates one at each end of said housing each spaced from a corresponding one of said end plates to provide an air chamber therebetween, the space between said two stator plates constituting a rotor chamber, a principal exhaust passage leading from said rotor chamber through said housing, a shaft mounted for free rotary and limited axial movement extending across said rotor chamber and outwardly through the aperture in said one of said end plates, auxiliary exhaust apertures in said one of said ends plates, a turbine rotor having opposed ends, said rotor being fixed to said shaft between said two stator plates and having ends adjacent said opposed stator plates in said housing, fluid passage means through each of said stator plates, turbine buckets on said rotor extending axially from each axial end and near the periphery thereof, tangentially directed nozzle means on each said opposed stator plate arranged radially outwardly of said fluid passage means to direct a fluid under pressure tangentially outwardly in a plane normal to the axis of said stator to impinge against said buckets, said turbine buckets being of greater axial length adjacent said nozzle means and of diminishing length radially outwardly thereof, so that the flow of fluid under pressure is progressively throttled as it passes said turbine buckets, said shaft means extending axially from said rotor through said one of said end plates and having valve means mounted thereon positioned to cooperate with the auxiliary exhaust passage in said end plate, so that upon axial movement of said shaft, the degree of restriction of said auxiliary exhaust passage is varied.

5. In a dental turbine, a housing, a pair of end plates in said housing, a pair of stator plates positioned axially inwardly of said end plates, a shaft mounted for free rotation and having means to provide limited axial movement in said housing, a rotor fixed to said shaft for movevent therewith, said rotor being provided on each end adjacent said stator plates with turbine rotor blades extending generally radially about said rotor, turbine stator blades formed on said stator plates arranged in a circle radially inwardly of said turbine rotor blades, the spaces between said stator blades forming substantially tangential nozzle means to direct air under pressure against the radially inner edges of said rotor blades, and air pressure supply passages through said stator plates radially inwardly of said stator blades, said rotor blades being axially tapered radially outwardly toward the periphery of said rotor, and the surface of said stator plates being shaped to provide uniform clearance along the ends of said rotor blades, the taper of said blades being such as to assure a positive axial pressure between said rotor and said end plates at all points, when said rotor is centered axially between said stator plates, and an exhaust passage through said housing radially outwardly of said rotor.

References Cited by the Examiner
UNITED STATES PATENTS

| | | | |
|---|---|---|---|
| 445,593 | 2/1891 | Austin | 253—74 |
| 661,183 | 11/1900 | Lount. | |
| 760,776 | 5/1904 | Campbell. | |
| 782,222 | 2/1905 | Cuthberth et al. | |
| 839,999 | 1/1907 | Kellogg | 253—86 X |
| 1,003,020 | 9/1911 | Webb | 103—104 |
| 1,091,581 | 3/1914 | Ljungstrom | 230—131 |
| 1,990,059 | 2/1935 | Bertin | 253—79 |
| 2,318,990 | 5/1943 | Doran | 253—16.5 |
| 2,458,128 | 1/1949 | Alterio | 253—91 |
| 2,763,461 | 9/1956 | Hill | 253—3 |

FOREIGN PATENTS

| | | |
|---|---|---|
| 250,207 | 2/1927 | Great Britain. |

DONLEY J. STOCKING, *Primary Examiner.*

HENRY F. RADUAZO, KARL J. ALBRECHT,
*Examiners.*